United States Patent Office 3,214,428
Patented Oct. 26, 1965

3,214,428
SUBSTITUTED ACETONITRILES AND THEIR SYNTHESIS
Morton Brown, Wilmington, Del., assignor to E. I. du Pont de Nemours and Company, Wilmington, Del., a corporation of Delaware
No Drawing. Filed Apr. 4, 1961, Ser. No. 100,531
11 Claims. (Cl. 260—251)

This invention has as its principal objects the provision of new substituted acetonitriles and a process for preparing them.

Acetonitrile is widely used as a solvent and chemical intermediate. Also, many simple substituted acetonitriles are readily available and are useful in synthetic reactions. However, little effort has been expended on the preparation of more complicated acetonitriles.

A new class of acetonitriles has now been obtained which have attached to the α-carbon two tertiary nitrogens, each of said nitrogens being bonded to two other carbons (other than α-carbon) at least one of which is aliphatic. These new compounds are represented by the general formula:

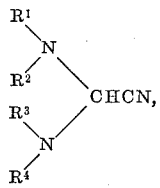

wherein $R^1$, $R^2$, $R^3$ and $R^4$, taken individually, are lower aliphatic groups, i.e., groups containing 1–6 carbon atoms, or cycloaliphatic groups of at least 5 ring atoms and are selected such that each α-nitrogen carries up to 10 chain atoms and no more than one cycloaliphatic radical. $R^2$ and $R^3$, taken together (Z), can form, with the nitrogens to which they are attached, a heterocyclic ring of 5–6 ring atoms, said ring containing only 2 hetero atoms, i.e., both α-nitrogens.

Preferably at least one bond of each nitrogen is attached to a methylene group (—CH$_2$—). The preferred compounds of this invention are further illustrated by the formulas:

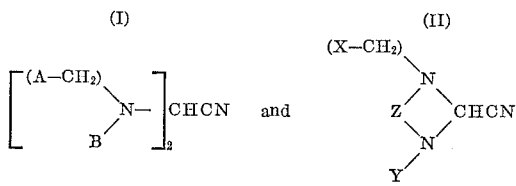

wherein A and X are selected from the class consisting of H, lower alkyl and lower alkene, i.e., alkyl and alkenyl of from 1–6 carbon atoms; B and Y are selected from the class consisting of lower alkyl, lower alkenyl, and cycloalkyl of from 5–6 carbon atoms, the total number of carbon atoms in A plus B and in X plus Y, respectively, being in the range of 1–9; A and B may be taken together, and with the carbon and nitrogen atoms to which they are respectively attached, form a heterocyclic ring of 3 (i.e., A and B together may be —CH$_2$—) to 6 ring atoms, the AB portion of said ring being a saturated divalent, aliphatic chain; and Z is divalent lower alkylene of 2–3 carbon atoms in length, i.e., Z can be —(CH$_2$)$_{2-3}$—, —CH$_2$—(CH$_3$)$_2$—CH$_2$—, etc.

Most preferred, because of the availability of their precursor amines, are the thus described compounds of Formula I in which (A—CH$_2$—) and B are identical and each is lower alkyl; and, when A and B are taken together, those in which the AB portion of the heterocyclic ring is (—CH$_2$—). The most preferred compounds of Formula II are the thus described compounds in which (X—CH$_2$—) and Y are identical and each is lower alkyl, and Z is divalent alkylene of 2–3 carbon atoms.

The new compounds of this invention are prepared by reaction of an α-diloweralkylamino-α-loweralkoxyacetonitrile with secondary aliphatic, including cycloaliphatic, mono- and diamines. For example the monoamine, $R^1R^2NH$, reacts as follows:

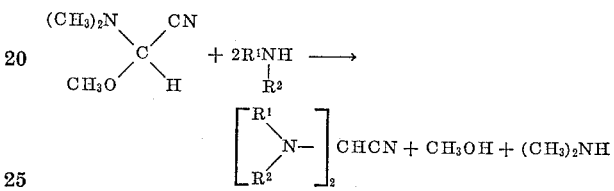

with a diamine, the reaction is as follows:

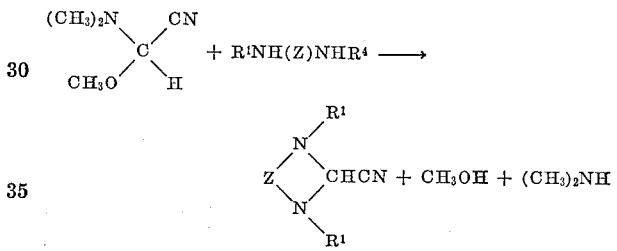

The preceding equations employ α-dimethylamino-α-methoxyacetonitrile. In place of the methyl groups, other lower alkyl groups can be present, e.g., ethyl, propyl, butyl or hexyl. It is preferred that in the reaction, the secondary mono- or diamine employed should boil at a higher temperature than the by-product dialkylamine corresponding to the diloweralkylamino group of the starting substituted acetonitrile to permit completion of the reaction in a relatively short time.

Although mixtures of different secondary amines (including mono- and diamines) can be used in the above reaction, e.g., $R^1R^2NH$ and $R^3R^4NH$, separation and isolation of individual species from the mixture obtained presents a problem. For this reason, it is preferred that a single amine species be used whereby there are obtained symmetrical α,α-bis(disubstituted-amino) acetonitriles as indicated in the above equations. Also, it is preferred that a molar ratio of at least two moles of the amine per mole of α-diloweralkylamino-α-loweralkoxyacetonitrile be used to reduce the formation of, e.g.,

[(CH$_3$)$_2$N][R$^1$R$^2$N]CHCN when α-dimethylamino-α-methoxyacetonitrile is one reactant and $R_1$ and $R_2$ are other than CH$_3$.

In the above equations and discussion thereof, $R^1$, $R^2$, $R^3$, $R^4$ and Z are as defined in the discussion of the product hereinabove. Thus, it is preferred that each of [R¹R²N] and [R³R⁴N] is [(A—CH₂)BN]; or, that R¹ is (X—CH₂—), R⁴ is Y and Z is divalent lower alkylene of 2–3 carbon atoms in length, etc.

The reaction of this invention takes place under anhydrous conditions without the necessity of added catalysts. The temperature is generally 0–100° C. with time being dependent upon the temperature, e.g., about an hour at 50° C. and less at higher temperatures; whereas, more time is sometimes employed at lower temperatures. Usually times of ¼ to two hours are sufficient.

An anhydrous solvent is preferably present. An aromatic hydrocarbon such as benzene is particularly suitable in dissolving the reactants and products. Furthermore, such hydrocarbons are useful in removing reaction products through distillation, and the aromatic hydrocarbon-methanol azeotrope also gives a convenient measure of the extent of reaction.

Although the molar ratio of secondary amine to α-diloweralkylamino-α-loweralkoxyacetonitrile is not critical, it generally is at least 2 or 3:1.

The new compounds of this invention are isolated by distillation or crystallization from suitable organic solvents. The reaction and isolation of the compounds should take place under anhydrous conditions to avoid loss of compound through decomposition. The new compounds are high boiling liquids or are solid at room temperature. They are also somewhat unstable to air containing water vapor, crystalline compounds slowly becoming discolored and moist under such conditions while liquid compounds become discolored, probably by autooxidation.

The following examples further illustrate the preparation and properties of the new acetonitriles of this invention. Temperatures are in degrees centigrade and parts are by weight.

EXAMPLE I

α,α-Bis(N-pyrrolidino)acetonitrile

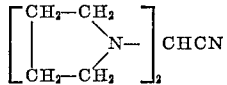

(A) *Preparation of α-dimethylamino-α-methoxyacetonitrile.*—To a cold (0°) solution of 35 parts of anyhdrous hydrogen cyanide in 200 parts of anhydrous ether, 76 parts of dimethylformamide dimethyl acetal was added dropwise over 0.5 hour while maintaining the temperature below 10°. The mixture was allowed to stand at 25° for 16 hours, then the ether was distilled at 25° and 100 mm. pressure. The residual liquid was distilled under reduced pressure to give 68.9 parts (93% of theoretical), B.P. 70–72° (40 mm.), $n_D^{25}$ 1.4110, of α-dimethylamino-α-methoxyacetonitrile.

*Analysis.*—Calcd. for $C_5H_{10}N_2O$: C, 52.61; H, 8.85; N, 24.60. Found: C, 52.81; H, 8.78; N, 24.48.

The Raman spectrum showed absorption at 2231 cm.⁻¹, indicative of the presence of a C≡N group.

This procedure may be employed to prepare the other α-diloweralkylamino-α-loweralkoxyacetonitriles simply by starting with the corresponding diloweralkylformamide diloweralkyl acetal.

(B) *Preparation of α,α-bis(N-pyrrolidino)acetonitrile.*—To a solution of 11.4 parts of α-dimethylamino-α-methoxyacetonitrile in 50 parts of benzene was added 14.2 parts of pyrrolidine. The mixture became slightly warm. An efficient fractional distillation column was attached and the contents of the flask refluxed over a period of one hour. Dimethylamine was evolved over this time and vented through the outlet of the column. The benzene-methanol azeotrope, B.P. 58°, was slowly distilled over approximately one hour until no more azetrope was formed. The residual solution was concentrated under reduced pressure, and the residual liquid distilled in vacuo. There was isolated 12.1 g. (68%), B.P. 109–111° (3.5 mm.), $n_D^{25}$ 1.4838, of α,α-bis(pyrrolidino)acetonitrile.

*Analysis.*—Calcd. for $C_{10}H_{17}N_3$: C, 66.99; H, 9.55; N, 23.44. Found: C, 67.03; H, 9.55; N, 23.84.

The Raman spectrum showed strong C≡N absorption at 2231 cm.⁻¹. The infrared spectrum indicated the absence of NH or C=O.

A solution of 25 parts of freshly distilled α-collidine and 3 parts of α,α-bis(N-pyrrolidino)acetonitrile was heated in an oil bath under an atmosphere of nitrogen. At a bath temperature of 225° (liquid temperature 175°) HCN was evolved slowly, and after 24 hours under these conditions HCN evolution was complete. The solvent was evaporatively distilled and the residual solid recrystallized from acetonitrile to give 1.86 parts (73%) of tetrakis(N-pyrrolidino)ethylene, M.P. 94–95°.

The dimethylformamide dimethyl acetal used in part (A) was prepared as follows:

A corrosion-resistant pressure vessel of internal capacity corresponding to 500 parts of water was charged with 146 parts of N,N-dimethylformamide and 33 parts (0.25 molar proportion based on the formamide) of carbonyl fluoride. The reaction mixture was let stand under autogenous pressure at 25° C. for 21 hours. The reactor was then vented to the atmosphere and the reaction mixture removed. Fractional distillation afforded 30 parts (63% of theory) of 1,1-difluorotrimethylamine as a colorless, fuming liquid boiling at 47–51.5° C. The nuclear magnetic resonance spectrum was wholly consistent with the difluorotrimethylamine structure showing two different kinds of hydrogen in a 6:1 ratio of intensities, with the smaller peak being a triplet, and only one type of fluorine and that a doublet. The product was still further characterized as 1,1-difluorotrimethylamine by mass spectrometer analysis and also through its infrared spectrum.

*Analysis.*—Calcd. for $C_3H_7F_2N$: F, 40.0%; N, 14.7%. Found: F, 39.4%; N, 15.4%.

In a spherical glass reactor fitted with a thermometer, a mechanical stirrer, and a dropping funnel of internal capacity corresponding to 3,000 parts of water was placed a mixture of 486 parts of freshly opened commercial sodium methoxide and 1500 parts of anhydrous diethyl ether. The reaction mixture was protected with a blanket of dry nitrogen while it was cooled to 0° C. by application of an external ice/water/salt bath. Approximately an 0.5 molar proportion charge (410 parts) of freshly distilled 1,1-difluorotrimethylamine, i.e., N-difluoromethyl-N,N-dimethylamine, was added dropwise with stirring over a period of one hour while maintaining the reaction mixture at between 0 and 10° C. still under an anhydrous nitrogen atmosphere. After the addition was completed, the mixture was let stand at room temperature with stirring for a period of one hour. The solid sodium fluoride was then removed by filtration, and the diethyl ether solvent removed from the filtrate by distillation at atmospheric pressure. Continued distillation of the residue through a precision fractionation column afforded 374 parts (73% of theory) of dimethylformamide dimethyl acetal, i.e., dimethoxytrimethylamine, i.e., N-dimethoxymethyl-N,N-dimethylamine, as a clear, colorless liquid boiling at 101–102° C. at atmospheric pressure; $n_D^{25}$, 1.3957.

*Analysis.*—Calcd. for $C_5H_{13}NO_2$: C, 50.4%; H, 11.0%; N, 11.8%. Found: C, 50.4%; H, 10.9%; N, 11.8%.

The other diloweralkylformamide diloweralkyl acetals may also be prepared by the above procedure by choice of the appropriate starting material as will be evident to those skilled in the chemical arts.

EXAMPLE II 1,3-dimethyl-2-cyano-1,3-diazacyclohexane

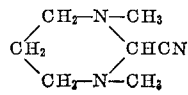

In a manner similar to Example IB above, 10.2 parts of N,N'-dimethyl-1,3-propanediamine was added to a solution of 11.4 parts of α-dimethylamino-α-methoxyacetonitrile and 50 parts of benzene. The 1,3-dimethyl-2-cyano-1,3-diazacyclohexane, M.P. 42–43°, after recrystallization from cyclohexane amounted to 9.05 parts (65%). The crystals were unstable to air containing water vapor, rapidly becoming discolored and moist.

*Analysis.*—Calcd. for $C_7H_{13}N_3$: C, 60.39; H, 9.42; N, 30.19. Found: C, 60.25; H, 9.58; N, 30.30.

EXAMPLE III

*α,α-Bis(di-n-propylamino)acetonitrile*

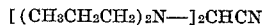

By the method of Example IB there was isolated from 11.4 parts of α-dimethylamino-α-methoxyacetonitrile, 50 parts of benzene, and 20.2 parts of di-n-propylamine, a total of 14.60 parts (61%) of α,α-bis(di-n-propylamino)-acetonitrile, B.P. 115–118° (4.5 mm.); $n_D^{25}$, 1.4460.

*Analysis.*—Calcd. for $C_{14}H_{29}N_3$: C, 70.30; H, 12.10; N, 17.60. Found: C, 70.18; H, 12.00; N, 17.54.

By substituting di-n-pentylamine for di-n-propylamine in the above method, α,α-bis(di-n-pentylamino)acetonitrile is readily obtained. Similarly, diisopropylamine or di-2-ethylpropylamine may be reacted to give the corresponding acetonitriles.

EXAMPLE IV

*1,3-diethyl-2-cyanoimidazolidine*

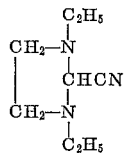

From the reaction of 11.4 parts of N,N'-diethyl ethylenediamine, 50 parts of benzene, and 11.4 parts of α-dimethylamino-α-methoxyacetonitrile by the procedure of Example IB, there was obtained 9.82 parts (65%) of 1,3-diethyl-2-cyanoimidazolidine, B.P. 130–133° (42 mm.); $n_D^{25}$, 1.4532.

*Analysis.*—Calcd. for $C_9H_{15}N_3$: C, 62.70; H, 9.86; N, 27.44. Found: C, 62.56; H, 9.81; N, 27.32.

EXAMPLE V

*1,3-dimethyl-2-cyanoimidazolidine*

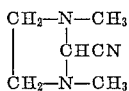

The general procedure of Example VI was repeated except that 13 parts of N,N'-dimethyl ethylenediamine was employed as the secondary amine. There was obtained 9.6 parts of 1,3-dimethyl-2-cyanoimidazolidine boiling at 68–70° at 4 mm.

EXAMPLE VI

*α,α-Bis(N-methylcyclohexylamino)acetonitrile*

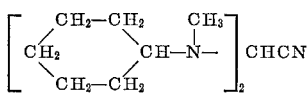

From the reaction of 11.4 parts of α-dimethylamino-α-methoxyacetonitrile, 40 parts of benzene and 22.6 parts of N-methylcyclohexylamine by the procedure of Example IB, there was isolated 15.7 parts (60%) of α,α-bis(N-methylcyclohexylamino)acetonitrile, B.P. 79° (0.5 mm.); $n_D^{25}$, 1.4727.

*Analysis.*—Calcd for $C_{16}H_{29}N_3$: C, 72.94; H, 11.09; N, 15.97. Found: C, 72.63; H, 11.01; N, 15.68.

EXAMPLE VII

*α,α-Di-N-piperidinoacetonitrile*

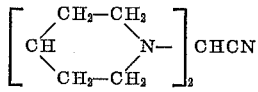

To a solution of 11.4 parts of α-dimethylamino-α-methoxyacetonitrile in 50 parts of benzene was added 17 parts of piperidine and the reaction conducted as in Example IB. Upon distillation there was obtained 14.2 parts of α,α-di-N-piperidinoacetonitrile, B.P. 138–139° (3.5 mm.); $n_D^{25}$, 1.4936.

*Analysis.*—Calcd. for $C_{12}H_{21}N_3$: C, 69.52; H, 10.21; N, 20.27. Found: C, 69.40; H, 10.17; N, 20.34.

Three parts of α,α-di-N-piperidinoacetonitrile was heated in a nitrogen atmosphere to approximately 250°. HCN evolution was brisk at this temperature. After four hours HCN evolution had ceased and the residual solid recrystallized from acetonitrile to give 1.78 parts (68%) of tetrakis(N-piperidino)ethylene, M.P. 59–61°. A mixed melting point with an independently prepared sample was undepressed.

In addition to the amines as shown in the examples, others may also be employed. Thus, when the process as specifically exemplified heretofore is repeated except that the amine is dimethylamine, there is obtained α,α-bis-(dimethylamino)acetonitrile. Similarly, diethylamine gives α,α-bis(diethylamino)acetonitrile; n-butyl-n-hexylamine gives α,α-bis(N-n-butyl-N-n-hexyl-amino)acetonitrile; di-tert.-butylamine gives α,α-bis(di-tert.-butylamino) acetonitrile; methyl-n-hexylamine gives α,α-bis(N-methyl-N-n-hexylamino)acetonitrile diethenylamine gives α,α-bis(diethenylamino)acetonitrile; allyl methylamine gives α,α - bis(N-allyl-N-methylamino)acetonitrile; ethenyl-n-hexylamine gives α,α-(N-ethenyl-N-n-hexylamino)-acetonitrile; n-butyl-n-hexenylamine gives α,α-bis(N-n-butyl-N - n-hexenylamino)acetonitrile; N-n-pentylcyclopentylamine gives α,α - bis(N-n - pentyl-N-cyclopentylamino) acetonitrile and N,N-dimethyl-2,2-dimethyl-1,3-propanediamine gives 1,3-dimethyl-2-cyano-5,5-dimethyl-1,3-diazacyclohexane.

The new α,α-bis(disubstitutedamino)acetonitriles of this invention, i.e., those embraced by the formula $$R^1R^2N—(R^1R^2)NCHCN$$

are useful as water scavengers in organic systems, particularly in view of their good organic solubility, and especially because, unlike other organic-soluble water scavengers, they result in non-corrosive products. Also, the tetraminoethylenes of these compounds are useful as oxygen scavengers or antioxidants and as chemical light sources, i.e., sources of cold light, since they chemiluminesce strongly when exposed to air.

Since obvious modifications and equivalents in the invention will be evident to those skilled in the chemical arts, I propose to be bound solely by the appended claims.

The embodiments of the invention in which an exclusive property or privilege is claimed as defined as follows:

1. 1,3-dimethyl-2-cyano-1,3-diazacyclohexane.
2. 1,3-diethyl-2-cyanoimidazolidine.
3. A process for preparing substituted acetonitriles which comprises contacting, at a temperature of about 0–100° C. and under substantially anhydrous conditions, an α-diloweralkylamino-α-loweralkoxyacetonitrile with a reactant selected from the class consisting of $R^1R^2NH$ and $R^1NH(Z)NHR^1$ wherein $R^1$ is of the group consisting of alkyl of 1–6 carbons and alkenyl of 1–6 carbons, and $R^2$ is of the group consisting of alkenyl of 1–6 carbons, alkene of 1–6 carbons and cycloalkyl of at least 5 ring carbons, the total number of carbons in $R^1$ and $R^2$ being up to 10; $R^1$ and $R^2$ on the same α-nitrogen can be taken together to form an alkenylene group of 2–5 chain carbons and a total of up to 10 carbons; and, in the second formula, Z represents alkylene of 2–3 carbons, with the total number of carbons in the two $R^1$'s being up to 10.

4. The process of claim 3 wherein the reactant is dimethylamine.

5. The process of claim 3, wherein the reactant is pyrrolidine.

6. The process of claim 3 wherein the reactant is N,N'-dimethyl-1,3-propanediamine.

7. The process of claim 3 wherein the reactant is di-n-propylamine.

8. The process of claim 3 wherein the reactant is N,N'-diethyl ethylenediamine.

9. The process of claim 3 wherein the reactant is N,N'-dimethyl ethylenediamine.

10. The process of claim 3 wherein the reactant is N-methylcyclohexylamine.

11. The process of claim 3 wherein the reactant is piperidine.

References Cited by the Examiner
UNITED STATES PATENTS

| | | | |
|---|---|---|---|
| 2,439,359 | 4/48 | Dixon et al. | 260—465.5 |
| 2,719,156 | 9/55 | de Benneville et al. | 260—465.5 |

OTHER REFERENCES

Erickson: "Journal of Organic Chemistry," vol. 20, pages 1569–72 (1955).

IRVING MARCUS, *Primary Examiner.*

WALTER A. MODANCE, *Examiner.*

UNITED STATES PATENT OFFICE
CERTIFICATE OF CORRECTION

Patent No. 3,214,428            October 26, 1965

Morton Brown

It is hereby certified that error appears in the above numbered patent requiring correction and that the said Letters Patent should read as corrected below.

Column 6, line 72, for "alkenyl" read -- alkyl --; line 73, for "alkene" read -- alkenyl --; column 7, line 1, for "alkenylene" read -- alkylene --.

Signed and sealed this 25th day of October 1966.

(SEAL)
Attest:

ERNEST W. SWIDER            EDWARD J. BRENNER
Attesting Officer            Commissioner of Patents